United States Patent
Shimizu

(10) Patent No.: US 8,262,951 B2
(45) Date of Patent: Sep. 11, 2012

(54) MOLD FORMING METHOD AND APPARATUS, AND PLASTIC LENS MANUFACTURING METHOD AND APPARATUS

(75) Inventor: Hiroshi Shimizu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1089 days.

(21) Appl. No.: 11/655,922

(22) Filed: Jan. 22, 2007

(65) Prior Publication Data

US 2007/0170557 A1    Jul. 26, 2007

(30) Foreign Application Priority Data

| Jan. 20, 2006 | (JP) | 2006-012051 |
| Jan. 20, 2006 | (JP) | 2006-012052 |
| Nov. 9, 2006 | (JP) | 2006-304323 |

(51) Int. Cl.
*B29D 11/00* (2006.01)
*B29C 33/40* (2006.01)
*B29C 45/00* (2006.01)

(52) U.S. Cl. ..... 264/1.32; 264/2.5; 264/219; 264/326.1; 425/808

(58) Field of Classification Search ............ 264/2.5, 264/132, 219, 328.1, 1.32; 425/808
See application file for complete search history.

(56) References Cited

U.S. PATENT DOCUMENTS 5,611,969 A * 3/1997 Cano et al. ..... 264/2.5
6,843,940 B2 * 1/2005 Reed et al. ..... 264/2.2

FOREIGN PATENT DOCUMENTS

| FR | 2 672 540 A1 | 8/1992 |
| GB | 2 236 273 A | 4/1991 |
| JP | 06-155481 A | 6/1994 |
| JP | 09-085754 A | 3/1997 |
| JP | 2001-277262 A | 10/2001 |
| JP | 2003-231134 A | 8/2003 |
| JP | 2003-231135 A | 8/2003 |
| JP | 2005-81772 A | 3/2005 |
| KR | 2007-0087715 A | 8/2007 |

* cited by examiner

*Primary Examiner* — Christina Johnson
*Assistant Examiner* — Michael Piery
(74) *Attorney, Agent, or Firm* — Sughrue Mion, PLLC

(57) ABSTRACT

A method of forming a mold, concludes: winding a tape around peripheral surfaces of a first molding die and a second molding die to assemble a mold; forming on the tape an injection port for injecting a resin material for forming a plastic lens into the mold; and forming a tab by cutting out a part of the tape non-circularly.

2 Claims, 11 Drawing Sheets

MOLD FORMING METHOD AND APPARATUS, AND PLASTIC LENS MANUFACTURING METHOD AND APPARATUS

The entire disclosure of Japanese Patent Application No. 2006-012051 and No. 2006-012052, filed Jan. 20, 2006, and No. 2006-304323, filed Nov. 9, 2006, is expressly incorporated by reference herein.

BACKGROUND

1. Technical Field The present invention relates to a method of forming a mold, a forming apparatus thereof, a method of manufacturing a plastic lens, and a manufacturing apparatus thereof.

2. Related Art

As a manufacturing apparatus for a plastic lens such as glasses, there is known a device including: a washing device for washing a first mold for forming a convex surface of a lens and a second mold for forming a concave surface of a lens; a forming apparatus for a mold for arranging the first molding die and the second molding die, which have been washed with the washing device, so that the first molding die and the second molding die oppose each other with a predetermined distance therebetween, and for winding an adhesive tape around peripheral surfaces of those molding dies; and a resin injection device for injecting a resin material into a cavity of the mold formed by the forming apparatus, which is formed by the tape, the first molding die, and the second molding die.

For injecting the resin material into the mold, an injection port through which the nozzle can be inserted and through which air is let out of the mold when the resin material is injected through the nozzle is necessary.

Up to now, the injection port is formed by blowing heat-compressed air to the tape wound around the peripheral surfaces of the pair of molding dies as disclosed in JP 09-85754 A.

In JP 09-85754 A, a circular injection port is formed by arranging a heat-compressed air ejecting tube at a predetermined position opposing the tape wound around the peripheral surfaces of the pair of molding dies, and blowing the heat-compressed air against the tape from an end opening of the ejection tube.

When the injection port is formed on the tape by the forming apparatus for a mold, the resin injection device is activated. First, the nozzle is inserted into the injection port and the resin material is filled into the cavity through the nozzle. The injection port needs to be sealed so that the resin material does not leak from the injection port after the resin material is filled in the cavity.

Up to now, the injection port is sealed by irradiating ultraviolet rays to cure the resin after an ultraviolet-curable resin is applied to the injection port as disclosed in JP 06-155481 A.

In the example disclosed in JP 09-85754 A, the heat-compressed air is blown against the tape wound around the peripheral surfaces of the pair of molding dies to bore the injection port, so a base material of the tape or a foreign matter of an adhesive or the like blown by the compressed air enters the cavity.

When a plastic lens is manufactured in a state where the foreign matter is in the cavity, there is a problem in that appearance of the plastic lens becomes poor, or that yield is reduced.

In the example disclosed in JP 06-155481 A, the injection port is entirely sealed with the ultraviolet-curable resin and is cured by irradiating the ultraviolet rays to the resin in order to seal the injection port. However, the injection port is formed in a large circular shape or in an elliptical annular shape in order that the nozzle can be inserted therethrough and that air within the cavity can be let out, so a large amount of expensive ultraviolet-curable resin is necessary.

Accordingly, in JP 06-155481 A, there is a problem that manufacturing cost for the plastic lens becomes high.

SUMMARY

A primary object of the invention is to provide a method of forming a mold, a forming apparatus thereof, a method of manufacturing a plastic lens, and a manufacturing apparatus thereof, which are capable of suppressing manufacturing cost while maintaining favorable appearance of the plastic lens.

A method of forming a mold according to an aspect of the invention is characterized by including: winding a tape around peripheral surfaces of a first molding die and a second molding die to assemble a mold; forming on the tape an injection port for injecting a resin material for forming a plastic lens into the mold; and forming a tab by cutting out a part of the tape non-circularly.

A mold forming apparatus according to another aspect of the invention is characterized in that: the mold forming apparatus includes: a device for winding a tape around peripheral surfaces of a first molding die and a second molding die; and a device for forming on the tape a tab for injecting a resin material for forming a plastic lens; and that the tab forming device forms the tab by cut out a part of the tab non-circularly.

According to the invention, in the tab forming executed by the tab forming device, a portion of the tape is non-circularly cut out through cutting or the like to form the tab non-circularly. Because the tab is formed non-circularly, the tab is integrated with a portion of the tape other than the tab and is bendable with the connection portion as a center. A large injection port may be formed by depressing the tab into the mold.

In the invention, the injection port is formed by using the non-circular tab, so the amount of processing chips or the like of a base material which are produced at a time of forming the injection port is extremely small as compared with the past case where the injection port has been formed circularly. Accordingly, the processing chips of the base material hardly enters the mold formed by winding the tape around the peripheral surfaces of the first molding die and the second molding die, so when a plastic lens is manufactured using this mold, appearance thereof does not deteriorate.

In sealing the injection port as necessary, a sealing material for sealing the injection port only needs to be provided on the periphery of the tab, so a usage amount of an expensive sealing material can be made smaller as compared with the past example where the circular injection port has been sealed over an entire surface. Thus, the manufacturing cost of the plastic lens can be suppressed.

In the method of forming a mold according to the aspect of the invention, it is preferable that the winding be performed on the tape around peripheral surfaces of the first molding die and the second molding die after forming the tab.

In the invention thus configured, the injection port is formed on the tape before the tape is wound around the peripheral surfaces of the first molding die and the second molding die, so the processing chips or the like of the base material, which is produced when forming the injection port, does not enter the mold.

Therefore, appearance of the plastic lens to be manufactured is further improved.

Further, the method of forming a mold according to the aspect of the invention may employ a structure, in which the injection port includes an injection port main body and a tab for sealing the injection port main body; the tab forming includes: forming the tab for sealing the injection port main body formed in advance; and superimposing a tape-like injection port forming portion having the injection port main body formed in advance, onto the tab; the tape superimposing includes positioning the injection port main body formed to have an area smaller than the area of the tab so that the injection port main body is positioned above the tab; and the tape winding includes winding the tape around the peripheral surfaces of the first molding die and the second molding die so that both end portions of the tape are superimposed on each other and that the tab is exposed.

In a similar manner, the mold forming apparatus according to the aspect of the invention preferably has a structure including: a device for forming an injection port main body having an area smaller than the area of the tab, on another end of the tape; and a tape winding device for superimposing both end portions of the tape so that the injection port main body is positioned above the tab and for winding the tape around the peripheral surfaces of the first molding die and the second molding die.

According to the invention, the tape on which the tab is formed in the tab forming is wound around the peripheral surfaces of the first molding die and the second molding die in the tape winding so that both ends thereof are superimposed on each other and that the tab is exposed. The injection port main body is formed on the tab (i.e., outer side of the mold) in the tab forming.

The mold thus formed has the tab formed non-circularly, so the tab is integrated with the portion of the tape other than the tab and is bendable with the connection portion as a center. A large opening continuous with the injection port main body is formed by depressing the tab into the mold, whereby the resin material for forming the plastic lens is injected into the mold through this space.

When a fluid level of the resin material injected into the mold rises, the tab also rises along with the rise of the fluid level of the resin material, and further, a lower end portion of the tab also rises due to elasticity of the tab, whereby the injection port main body is eventually sealed with the tab.

According to the invention, the tab is formed on the tape before the tape is wound around the peripheral surfaces of the first molding die and the second molding die, and the injection port main body is formed in the tape-like injection port forming portion. As a result, the processing chips or the like of the base material of the tape, which is produced when forming the tab or the injection port main body, does not enter the mold.

Therefore, when the plastic lens is manufactured using the mold formed as described above, there is no foreign matter in the mold. Thus, no foreign matter is included in the manufactured plastic lens, so appearance of the plastic lens does not deteriorate.

In addition, the tab eventually seals the injection port main body due to the rise of the resin material for forming the plastic lens injected into the mold. Accordingly, an expensive sealing material is not necessary for sealing the injection port main body, whereby the manufacturing cost of the plastic lens can be suppressed.

Further, it is preferable that the injection port forming portion is formed continuously with the end portion of the tape; and the injection port main body the forming and the tab forming are carried out substantially at the same time.

According to the invention, the injection port forming portion is formed continuously with the tape, so the injection port forming portion and the tape can be formed of a single tape, thereby increasing processing efficiency. Further, the injection port forming portion is formed on the tape before the tape is wound around the peripheral surfaces of the first molding die and the second molding die, so the processing chips or the like of the base material of the tape does not enter the mold.

A method of forming a plastic lens according to another aspect of the invention us characterized by including, after forming a mold by a method comprising: winding a tape around peripheral surfaces of a first molding die and a second molding die to assemble a mold; forming on the tape an injection port for injecting a resin material for forming a plastic lens into the mold; and forming a tab by cutting out a part of the tape non-circularly, depressing the tab through a nozzle and injecting a resin material for forming a plastic lens into the mold from an injection port from the nozzle.

A manufacturing apparatus for a plastic lens according to another aspect of the invention is characterized by including the mold forming apparatus and a resin injection device having a nozzle for depressing the tab, the device injecting the resin material for forming a plastic lens into the mold from the injection port through the nozzle.

In the invention thus configured, the tab is depressed into the mold by the nozzle in the resin injecting. A large space continuous with the injection port is formed by the depressing of the tab. In this case, a tip of the nozzle is positioned inside the mold, and the resin material for forming the plastic lens is injected into the mold from the tip of the nozzle in that state. By injecting the resin material for forming the plastic lens into the mold, air within the mold is let out through the space between the injection port and the nozzle.

The nozzle is pulled out of the mold when a predetermined amount of the resin material for forming the plastic lens is injected into the mold.

Subsequently, the bent tab is displaced toward its original position (position of the tab before being depressed by the nozzle) owing to the elasticity or buoyancy thereof, and eventually, the tab seals the injection port.

Therefore, according to the aspect of the invention, a manufacturing method of a plastic lens, which can achieve the above-mentioned effects, can be provided.

In addition, the nozzle for injecting the resin material for forming the plastic lens is used as a component for depressing the tab into the mold, resulting in a mutual use of the component.

In the invention according to the method of manufacturing a plastic lens, it is preferable to include a device for drawing back and restoring the tab depressed by the nozzle to its original position by sucking the tab.

In the invention thus configured, the tab is forcibly restored to a position at which the injection port is sealed in the tab restoring step after the resin material for forming the plastic lens is injected into the mold.

Therefore, the tab can be positively restored to its original position before being depressed irrespective of a presence/absence of the elasticity of the tab, whereby the sealing of the injection port can be performed positively. As a result, a plastic lens can be manufactured with a favorable precision.

The drawing back and restoring of the tab is preferably carried out by sucking the tab.

Further, the invention according to the manufacturing apparatus for a plastic lens preferably includes a tab drawing back and restoring device for restoring the tab depressed by the nozzle to its original position by sucking the tab.

In the invention thus configured, the tab is forcibly restored to a position at which the injection port is sealed in the tab restoring step after the resin material for forming the plastic lens is injected into the mold.

Therefore, the tab can be positively restored to its original position before being depressed irrespective of a presence/absence of the elasticity of the tab, whereby the sealing of the injection port can be performed positively. As a result, a plastic lens can be manufactured with a favorable precision.

In the invention according to the method of manufacturing a plastic lens, it is preferable to include sealing an injection port after the resin injecting.

In the invention according to the manufacturing apparatus for a plastic lens it is preferable to include a device for sealing the injection port.

In the invention thus configured, in a case where a gap is formed between the periphery of the tab and a portion of the tape in the vicinity thereof, the resin can be positively prevented from leaking from the injection port by sealing the gap by appropriate ways.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

Hereinafter, exemplary embodiments of the invention are described with reference to the drawings. Herein, in the description of the exemplary embodiments, similar components are assigned with similar reference symbols and description thereof will be omitted or simplified.

Figure 5A:
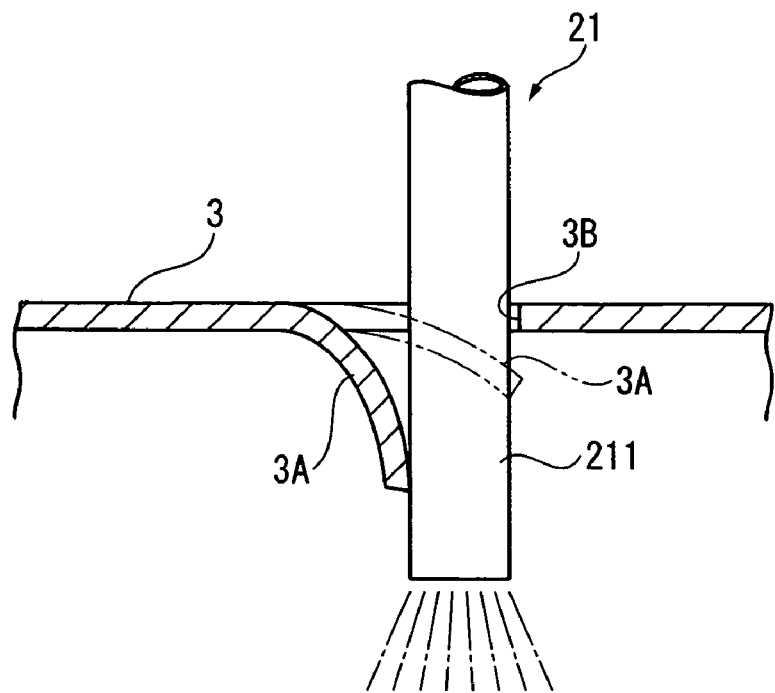
FIG. 5A is a sectional view showing a state where a resin material for forming a plastic lens is injected into the mold.
Figure 5B:
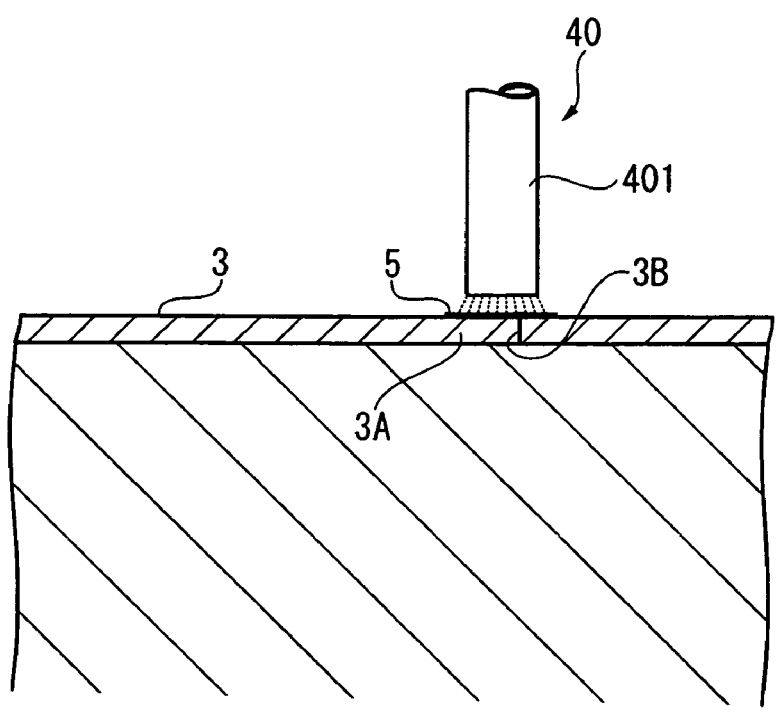
FIG. 5B is a sectional view showing a state where an injection port of the mold is sealed, respectively.

A first exemplary embodiment of the invention is described with reference to FIGS. 1 5B.

A plastic lens manufacturing apparatus according to the first exemplary embodiment includes a mold forming apparatus.

Figure 1:
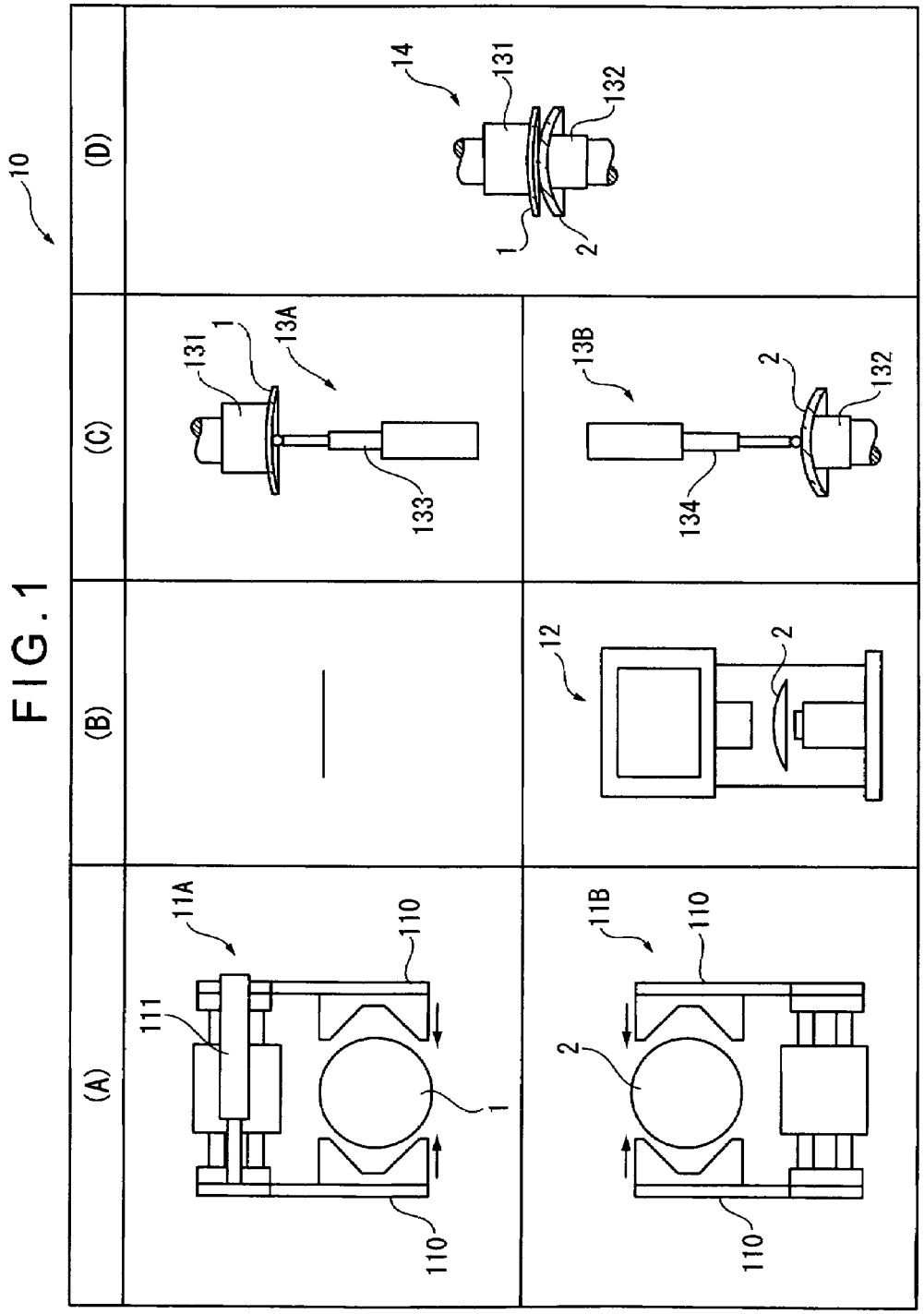
FIG. 1 is a schematic illustration showing parts of a forming apparatus for a mold and processes (A) to (D) of a method of forming a mold according to a first exemplary embodiment of the invention.
Figure 2:
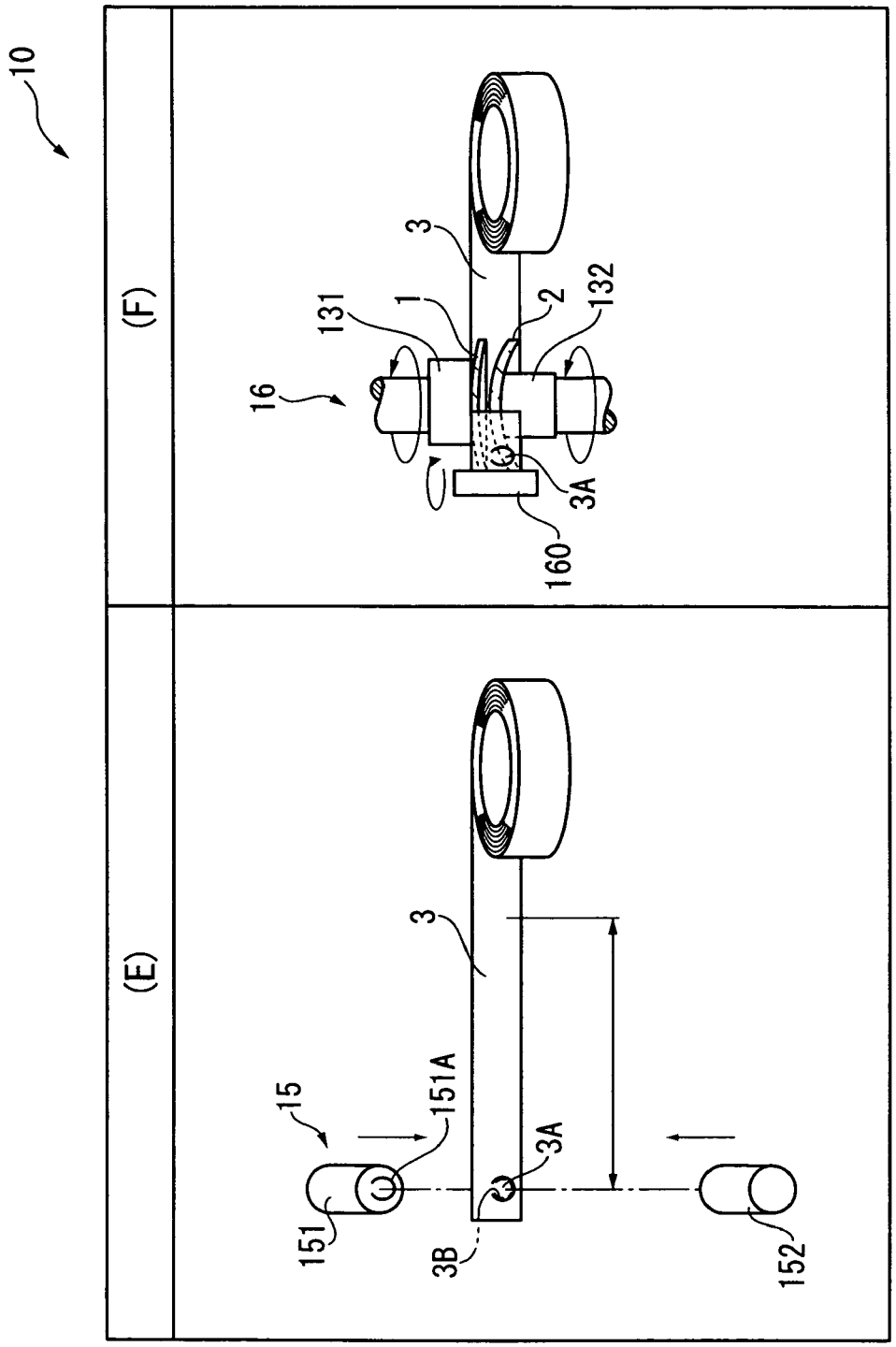
FIG. 2 is a schematic illustration showing remaining parts of the forming apparatus for a mold and processes (E) and (F) of the method of forming a mold according to the first exemplary embodiment.

A schematic configuration of the mold forming apparatus according to this exemplary embodiment is separately illustrated in FIGS. 1 and 2.

In FIGS. 1 and 2, a mold forming apparatus 10 includes: a first centripetal device 11A that positions a center position of a first molding die 1 having a circular shape; a second centripetal device 11B that positions a center position of a second molding die 2; a mold astigmatic axis detecting device 12 that detects a mold shaft of the second molding die 2 centripetally positioned by the second centripetal device 11B; a first measuring device 13A that measures thickness of the first molding die 1 centripetally positioned by the first centripetal device 11A; a second measuring device 13B that measures thickness of the second molding die 2 whose mold shaft has been detected by the mold astigmatic axis detecting device 12; a molding die positioning device 14 that arranges the first molding die 1 and the second molding die 2 to oppose each other with a predetermined distance therebetween; an injection port forming device 15 that forms an injection port in a tape 3; and a tape winding device 16 that winds the tape 3 around peripheral surfaces of the first molding die 1 and the second molding die 2.

As shown in process (A) in FIG. 1, the first centripetal device 11A includes a pair of arms 110 that chuck the first molding die 1, and a linear gauge 111 that centripetally positions the first molding die 1, which has been chucked, and measures an outer diameter thereof. Herein, the first molding die 1 is a glass cope having a bottom surface configured to be concave.

The second centripetal device 11B includes the pair of arms 110 that chuck the second molding die 2. Herein, the second molding die 2 is a glass drag having a top surface configured to be concave.

As shown in process (B) in FIG. 1, the mold astigmatic axis detecting device 12 includes an automatic lens meter and detects an astigmatic axis direction of the second molding die 2.

As shown in process (C) in FIG. 1, the first measuring device 13A includes a linear gauge 133 which abuts the bottom surface center position of the first molding die 1 being absorbed by a spindle 131. The first measuring device 13A measures the thickness of the first molding die 1 between the surface center position absorbed by the spindle 131 and the bottom surface center position thereof using the linear gauge 133.

The second measuring device 13B includes a linear gauge 134 which abuts the top surface center position of the second molding die 2 being absorbed by a spindle 132. The second measuring device 13B measures the thickness of the second molding die 2 between the surface center position absorbed by the spindle 132 and the top surface center position thereof using the linear gauge 134.

As shown in process (D) in FIG. 1, the molding die positioning device 14 includes: the spindle 131 that holds the first molding die 1; the spindle 132 coaxially provided with respect to the spindle 131, that holds the second molding die 2; and a control device (not shown) that controls operations of the spindles 131 and 132. The molding die positioning device 14 positions the spindles 131 and 132 to allow the center position of the first molding die 1 and the center position of the second molding die 2 to be apart from each other by a predetermined distance (center thickness). Further, the molding die positioning device 14 includes a laser restoring sensor (not shown) on a plane orthogonal to the axis of the spindle 131 and the spindle 132, and measures a position of each of the spindles 131 and 132 where a value of a portion corresponding to a thickness of a peripheral portion of a lens becomes a maximum value in order to calculate an injection port position where a nozzle to be described later is inserted into the mold 4.

As shown in process (E) in FIG. 2, the injection port forming device 15 forms a tab 3A by punching a part of the tape 3, which is to be wound around the peripheral surfaces of the first molding die 1 and the second molding die 2, in a substantially C shape. The injection port forming device 15 includes a pair of press dies 151 and 152 oppositely positioned with an intermediation of the tape 3. The press die 151 of the two press dies is a male die having a blade 151A of a substantially C shape, and the press die 152 of the other one of the two press dies is a female die that receives the blade 151A. By depressing the tab 3A, an injection port 3B having a large circular shape is formed in the tape 3 made of plastic.

According to this exemplary embodiment, the injection port forming device 15 is not limited to the press type structure in which the tape 3 is punched to form the tab 3A, and a method is not specified as long as the tab 3A can be formed. For example, there may be employed a cutting method using laser light, a method of pressing a heated die against the tape 3 to melt the tape 3, or a method of spraying heat-compressed air.

The shape of the tab 3A is not limited to the substantially C shape. As long as it is not a complete circle, there may be employed a squared C shape, a V shape, a semicircular arc shape, or the like.

As shown in process (F) in FIG. 2, the tape winding device 16 includes: a rotation driving device (not shown) that drives the spindle 131 holding the first molding die 1 to rotate; another rotation driving device (not shown) that drives the spindle 132 holding the second molding die 2 to rotate; and a guide roller 160 that presses the tape 3 against the peripheral surfaces of the first molding die 1 and the second molding die 2 in order to wind the tape 3 around the peripheral surfaces of the first molding die 1 and the second molding die 2. On a surface of the tape 3 which opposes the peripheral surfaces of the first molding die 1 and the second molding die 2, an adhesive is applied in advance. Accordingly, by operating the rotation driving devices in a state where an end portion of the tape 3 is adhered to portions of the peripheral surfaces of the first molding die 1 and the second molding die 2, the tape 3 is wound around the entire peripheral surfaces of the first molding die 1 and the second molding die 2.

After completion of winding of the tape 3 around the entire peripheral surfaces of the first molding die 1 and the second molding die 2, a predetermined position of the tape 3 is cut by a cutter (not shown) to form the mold 4.

Figure 3:
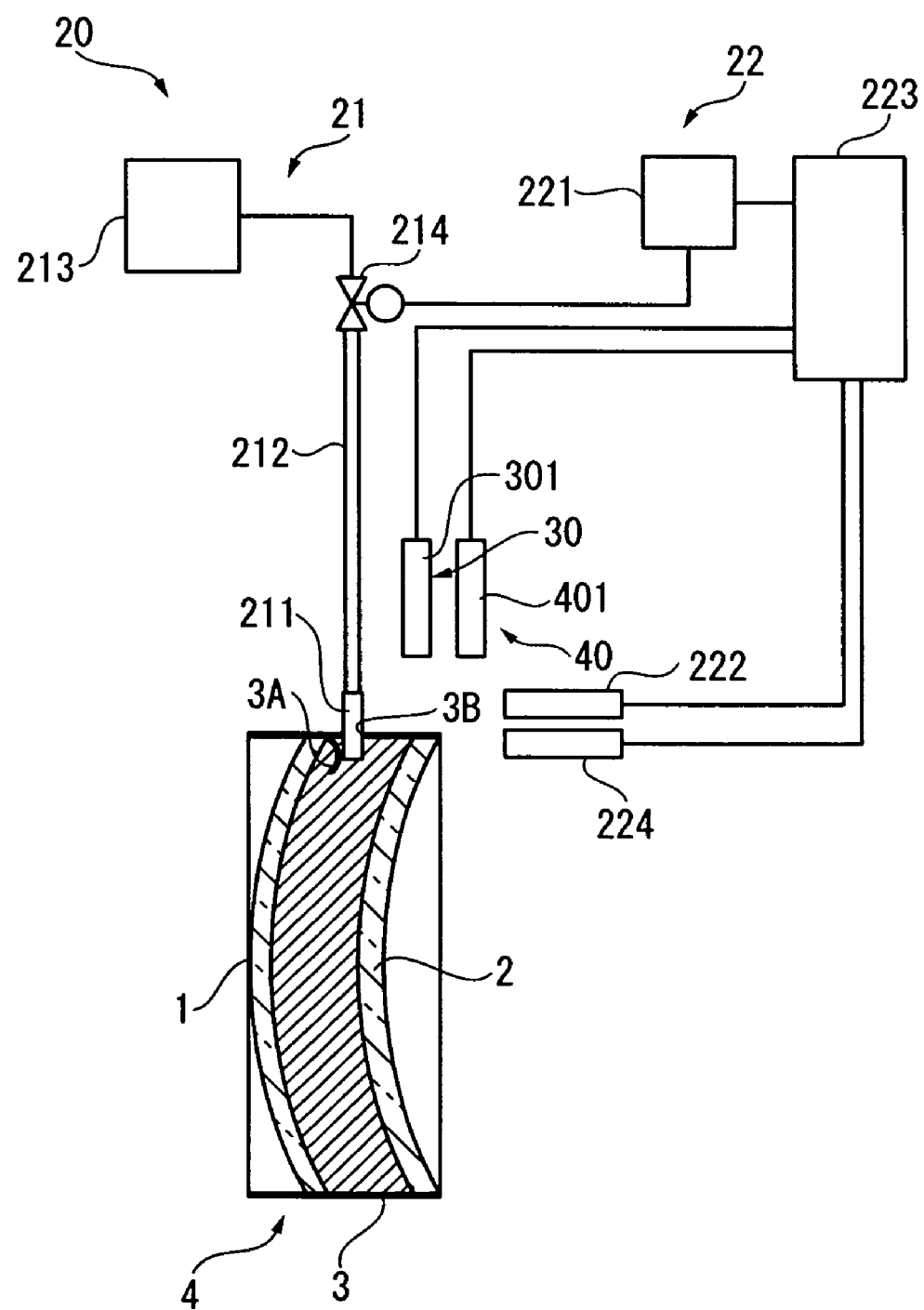
FIG. 3 is a diagram schematically showing a configuration of a plastic lens manufacturing apparatus according to the first exemplary embodiment other than the forming apparatus for a mold.

FIG. 3 shows the configuration of the plastic lens manufacturing apparatus except for the mold forming apparatus 10.

As shown in FIG. 3, the plastic lens manufacturing apparatus includes: a resin injection device 20 that injects a resin material for forming a plastic lens from the injection port 3B which is formed by depressing the tab 3A into the mold 4; a tab restoring device 30 that restores the tab 3A to its original position; and an injection port sealing device 40 that seals the injection port 3B.

The resin injection device 20 includes: a placing unit (not shown) that places the mold 4 so that an axial direction thereof becomes substantially horizontal; a supplying unit 21 that supplies the resin material to the inner portion of the mold 4; and a control unit 22 that controls an amount of the resin material to be supplied.

The supplying unit 21 includes: a nozzle 211 that injects the resin material into the mold 4 from the injection port 3B; a resin material flow tube 212 whose lower end portion is connected to a base end portion of the nozzle 211; and a material storing unit 213 that is connected to an upper end portion of the resin material flow tube 212. The resin material flow tube 212 is provided with an injection control valve 214. The injection control valve 214 controls an opening amount of the resin material flow tube 212, thereby controlling an amount of the resin material to be supplied from the nozzle 211.

The nozzle 211 is arranged so that an end thereof opposes the tab 3A formed in the tape 3 of the mold 4. Further, the nozzle 211 is configured so as to wedge the tab 3A into the mold 4 by an advancing and retreating device (not shown) and to detach from the tab 3A.

The control unit 22 includes: a flow rate regulating unit 221 that controls the injection control valve 214; a sensor 222 that detects that the resin material has been injected up to a predetermined position of the inner portion of the mold 4; a sensor 224 that switches a flow of the resin material; and a control unit main body 223 that controls the flow rate regulating unit 221 in response to signals from the sensors 222 and 224.

Each of the sensors 222 and 224 arranged in the vicinity of the injection port 3B of the mold 4 is an optical sensor that detects the amount of the resin material to be injected into the mold 4 using light.

The tab restoring device 30 restores the tab 3A depressed by the nozzle 211 to its original position, and includes a suction pipe 301 that sucks the tab 3A and a vacuum suction device (not shown) connected to a base end portion of the suction pipe 301. The vacuum suction device is controlled by the control unit main body 223.

The suction pipe 301 is capable of moving three-dimensionally. In a case where the resin injection device 20 or the injection port sealing device 40 is operated, the suction pipe 301 retreats to a position where the suction pipe 301 can avoid interference with the resin injection device 20 or the injection port sealing device 40. In a case where the tab restoring device 30 is operated, the suction pipe 301 moves to the vicinity of the tab 3A.

Figure 4A:
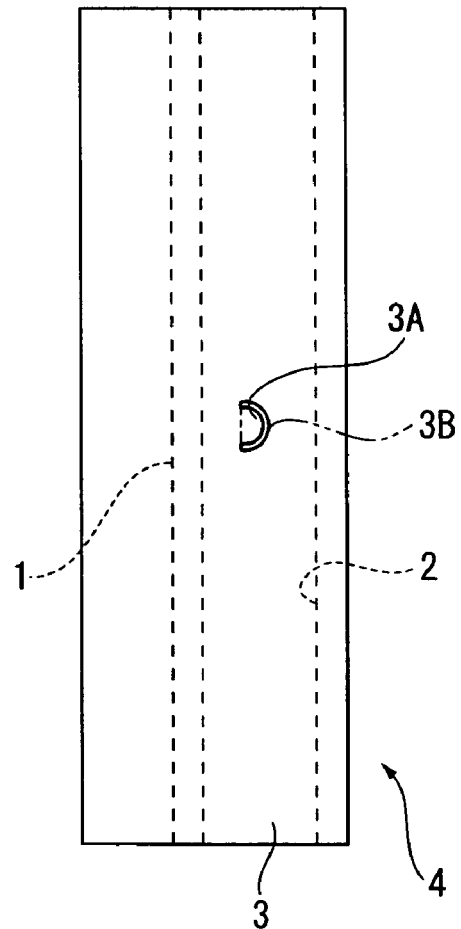
FIG. 4 is a side view of a mold and FIG. 4B is an enlarged side view of a main portion of the mold, respectively.
Figure 4B:
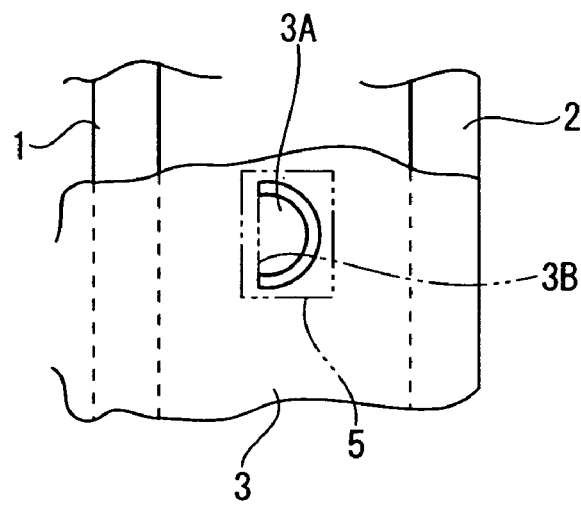

The injection port sealing device 40 seals a circumferential portion of the tab 3A restored to the original position, and includes a sealing resin supplying device (not shown) that supplies an ultraviolet-curable resin 5 (see FIG. 4B) to the circumferential portion of the tab 3A and an ultraviolet ray supplying device 401 that supplies ultraviolet rays to the ultraviolet-curable resin 5 covering an upper surface of the tab 3A.

The ultraviolet ray supplying device 401 is controlled by the control unit main body 223.

Subsequently, a method of manufacturing a plastic lens will be explained.

(Forming Mold)

First, as shown in process (A) in FIG. 1, the first molding die 1 is chucked by the first centripetal device 11A and the second molding die 2 is chucked by the second centripetal device 11B, whereby each molding die is centripetally positioned and the outer diameter is measured.

Then, as shown in process (B) in FIG. 1, using the mold astigmatic axis detecting device 12, the astigmatic axis direction of the second molding die 2 is detected and cylindrical (astigmatic) power thereof is measured.

As shown in process (C) in FIG. 1, the spindles 131 and 132 respectively absorbs and holds the first molding die 1 and the second molding die 2 by the first measuring device 13A and the second measuring device 13B, and the first measuring device 13A and the second measuring device 13B respectively measure the thickness of the first molding die 1 between the surface center position absorbed by the spindle 131 and the bottom surface center position thereof and the thickness of the second molding die 2 between the surface center position absorbed by the spindle 132 and the top surface center position thereof.

As shown in process (D) in FIG. 1, the molding die positioning device 14 positions each of the spindles 131 and 132 in a spacing direction, using data on the thickness of the first molding die 1 between the surface center position absorbed by the spindle 131 and the bottom surface center position thereof, the thickness of the second molding die 2 between the surface center position absorbed by the spindle 132 and the top surface center position thereof, and center thickness, to allow the center position of the first molding die 1 and the center position of the second molding die 2 to be apart from each other by a predetermined distance (center thickness). Further, the molding die positioning device 14 positions each of the spindles 131 and 132 in a rotating direction so that an injecting position is at a position where a value of a portion corresponding to the thickness of the peripheral portion of a lens becomes a maximum value in order to facilitate an insertion of the nozzle 211 when the resin material for forming a plastic lens is injected into the mold 4. In other words, a position of each of the spindles 131 and 132 where a value of a portion corresponding to the thickness of the peripheral portion of a lens becomes a maximum value is decided based on the astigmatic axis direction of the second molding die 2 measured by using the mold astigmatic axis detecting device 12. Further, a value of a portion corresponding to a thickness of a peripheral portion of the second molding die 2 and a portion corresponding to the thickness of the peripheral portion of a plastic lens at the injecting position is measured. Based on the value of the portion corresponding to the thickness of the peripheral portion of the second molding die 2 and the value of the portion corresponding to the thickness of the peripheral portion of a plastic lens, an injection port position in a thickness direction of the peripheral portion of the first molding die 1 and the second molding die 2 with the lower surface of the second molding die 2 as a reference is calculated. Then, based on the outer diameter of each of the first molding die 1 and the second molding die 2, outer peripheral values thereof are calculated.

As shown in process (E) in FIG. 2, the injection port forming device 15 performs an injection port forming step in which the part of the tape 3 is cut out non-circularly, whereby the tab 3A is formed.

The position at which the tab 3A is to be formed on the tape 3 in a height direction (the position in a width direction of the tape 3) is decided based on the calculated value of the injection port position with the lower surface of the second molding die 2 which is obtained in the previous step as a reference. The position in a lateral direction (the position in a longitudinal direction of the tape 3) is decided by controlling a tape winding start position so that the tab 3A comes to the position at which a value of a portion corresponding to the thickness of the peripheral portion of the positioned plastic lens becomes a maximum value.

After that, as shown in process (F) in FIG. 2, the tape winding device 16 winds the tape 3 on which the tab 3A has been formed around the peripheral surfaces of the first molding die 1 and the second molding die 2.

The first molding die 1 and the second molding die 2 are synchronously rotated by the spindles 131 and 132, whereby the tape 3 is wound around the peripheral surfaces of the first molding die 1 and the second molding die 2. When the tape 3 is wound around the peripheral surfaces of the first molding die 1 and the second molding die 2, the height of the lower surface of the second molding die 2 is the same as the height of the lower edge of the tape 3 (see FIG. 4A).

When the tape 3 is wound around the entire peripheral surfaces of the first molding die 1 and the second molding die 2 and a portion of the tape 3 overlaps another portion thereof, the tape 3 is cut. As a result, the mold 4 is structured.

(Resin Injection)

The resin injection device 20 injects the resin material for forming a plastic lens into the mold 4.

First, the mold 4 is positioned so that the tab 3A is at the highest position. After that, the nozzle 211 is lowered and the tab 3A is depressed with the lower end portion thereof (see FIG. 5A). The tab 3A is deformed in a curved manner due to the elastic force thereof. Since the tab 3A is deformed, the bent portion and the vacant portion formed through depressing of the tab 3A, form the injection port 3B having an annular shape on the tape 3.

Further, the resin material for forming a plastic lens is injected into the mold 4 from the injection port 3B via the nozzle 211. Herein, the control unit 22 initiates and terminates the injection and switches the injection flow.

The sensor 224 detects that the fluid level of the resin material for forming a plastic lens has reached the vicinity of the injection port 3B, and the injection flow is gradually decreased.

When the sensor 222 detects that the resin material for forming a plastic lens has filled the inner portion of the mold 4, the signal is transmitted from the sensor 222 to the control unit 22, thereby stopping the injection of the resin material for forming a plastic lens.

(Tab Restoring)

When a predetermined amount of the resin material is injected into the mold 4, the nozzle 211 is ascended. As a result, the tab 3A depressed by the lower end portion of the nozzle 211 returns to a position close to the original position due to the elastic force thereof and the ascendant level of the resin material (see the imaginary line of FIG. 5A).

Then, the tab restoring device 30 is operated. In other words, the suction pipe 301 is moved to the vicinity of the tab 3A, the tab 3A is sucked by the suction pipe 301 by operating the vacuum suction device, and the injection port 3B is sealed.

(Injection Port Sealing)

Subsequent to the resin injection step, the injection port sealing device 40 is operated to thereby seal the injection port 3B. In other words, the ultraviolet-curable resin 5 is applied only to the tab 3A of the tape 3 (see FIG. 5B) and the ultraviolet ray supplying device 401 irradiates ultraviolet rays onto the ultraviolet-curable resin 5, thereby curing the ultraviolet-curable resin 5. It should be noted that in FIGS. 5A and 5B, in order to indicate a configuration of the tab 3A clearly, a lateral surface of the cut out portion forming the tab 3A is illustrated in a wide manner.

(Heating and the Like)

After the injection port 3B is sealed, the mold 4 is placed in a furnace to be heated and cured.

The mold 4 is taken out of the furnace, the tape 3 wound around the mold 4 is peeled off, and the first molding die 1 and the second molding die 2 are removed, whereby the base material of a plastic lens is formed. The surface of the base material is polished, processed, etc. if required, whereby a plastic lens is obtained.

Therefore, the first exemplary embodiment can obtain the following effects.

(1) In order to form the injection port 3B from which the resin material is injected on the tape 3 of the mold 4, which is obtained by winding the tape 3 around the peripheral surfaces of the first molding die 1 and the second molding die 2, the tab 3A is formed by cutting out a portion of the tape 3 non-circularly. Since the injection port 3B is formed of the tab 3A having a non-circular shape, there is less possibility that foreign substance such as a processing chips of the base material of the tape 3 is included in the inner portion of the mold 4, as compared to an injection port 3B of the related art having an annular shape. Further, a plastic lens formed by using the mold 4 has a fine appearance.

In addition, since the ultraviolet-curable resin 5 that seals the injection port 3B only needs to be applied to the peripheral portion of the tab 3A, the usage amount of the expensive ultraviolet-curable resin 5 can be decreased as compared to an example of the related art in which the entire injection port having the annular shape is sealed. Accordingly, the manufacturing cost of a plastic lens can be lowered.

(2) The tape 3 is wound around the peripheral surfaces of the first forming tool 1 and the second forming tool 2 after the formation of the injection port 3B. As a result, there is no possibility that a processing chip of the base material of the tape 3, which is generated during the formation of the injection port 3B, or foreign substance is included in the inner portion of the mold 4. Therefore, the appearance of a plastic lens is further improved.

(3) A large injection port 3B is formed by depressing the tab 3A by using the nozzle 211 that injects the resin material for forming a plastic lens. By injecting the resin material for forming a plastic lens into the mold 4, air in the mold 4 is discharged to the outside through a gap between the injection port 3B and the nozzle 211. As a result, an air bubble is not generated inside a plastic lens to be manufactured, resulting in a higher quality of the lens.

(4) After injecting the resin material into the mold 4, the tab 3A depressed by using the nozzle 211 is restored to its original position by the suction pipe 301, and then, the injection port 3B is sealed. As a result, irrespective of a presence or absence of the elastic force of the tab 3A, by positively restoring the tab 3A to the original position before being depressed, the injection port 3B is positively sealed and therefore a plastic lens can be manufactured with high precision.

(5) In order to restore the tab 3A, the tab 3A is sucked in a vacuum manner. Therefore, the sealing of the injection port 3B, which is subsequently performed, can be positively performed.

(6) The ultraviolet-curable resin 5 is applied not in an arc manner along the peripheral portion of the tab 3A but in a rectangular manner to the upper surface of the tab 3A. Therefore, irrespective of a configuration of the peripheral portion of the tab 3A, the injection port 3B can be sufficiently sealed.

Subsequently, a second exemplary embodiment of the invention will be explained with reference to FIGS. 6 to 11B. The second exemplary embodiment is similar to the first exemplary embodiment except for the structure of the injection port and the device for forming the injection port.

Figure 6:
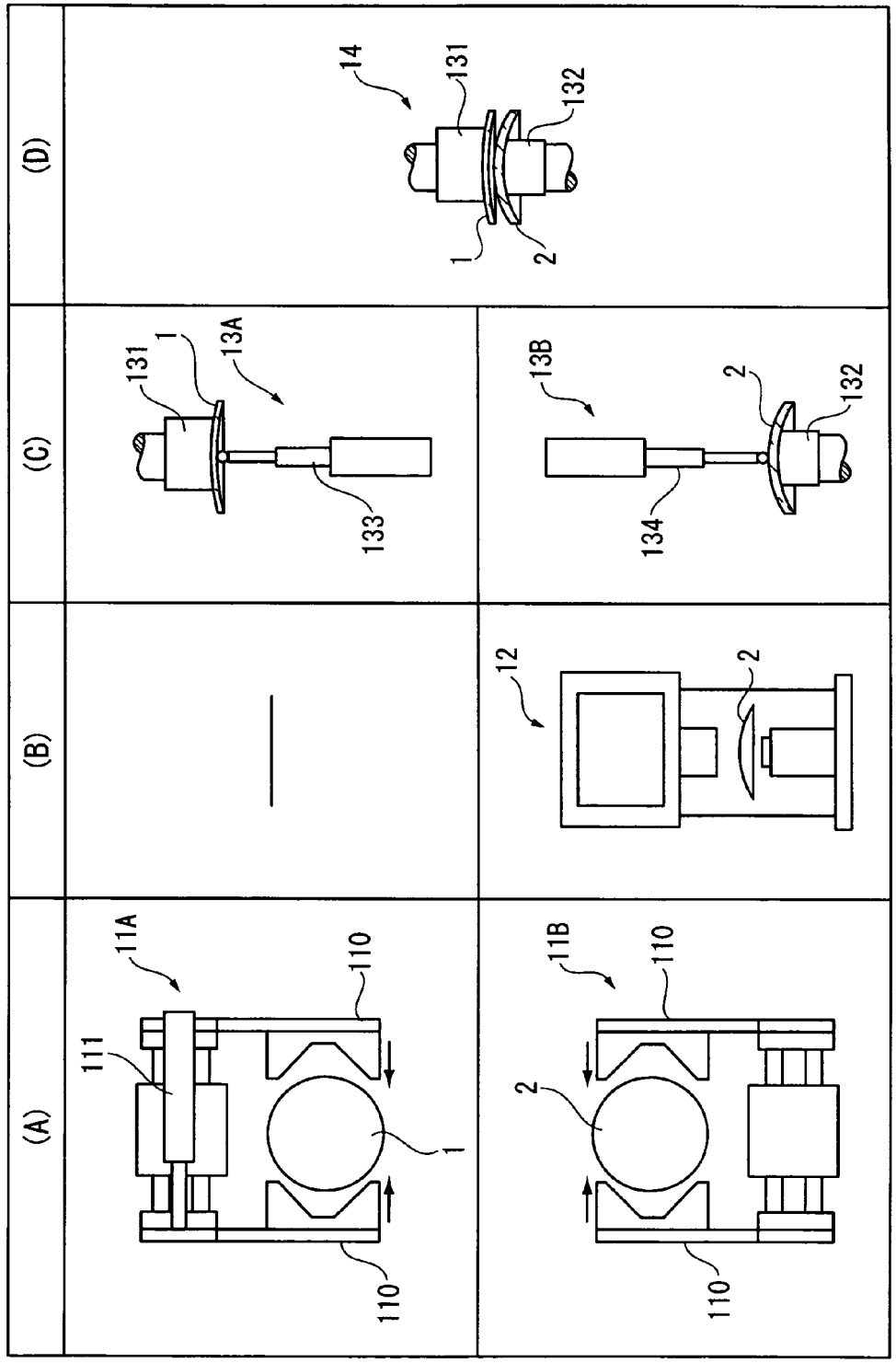
FIG. 6 is a schematic illustration showing a part of a forming apparatus for a mold and processes (A) to (D) of a method of forming a mold according to a second exemplary embodiment of the invention.
Figure 7:
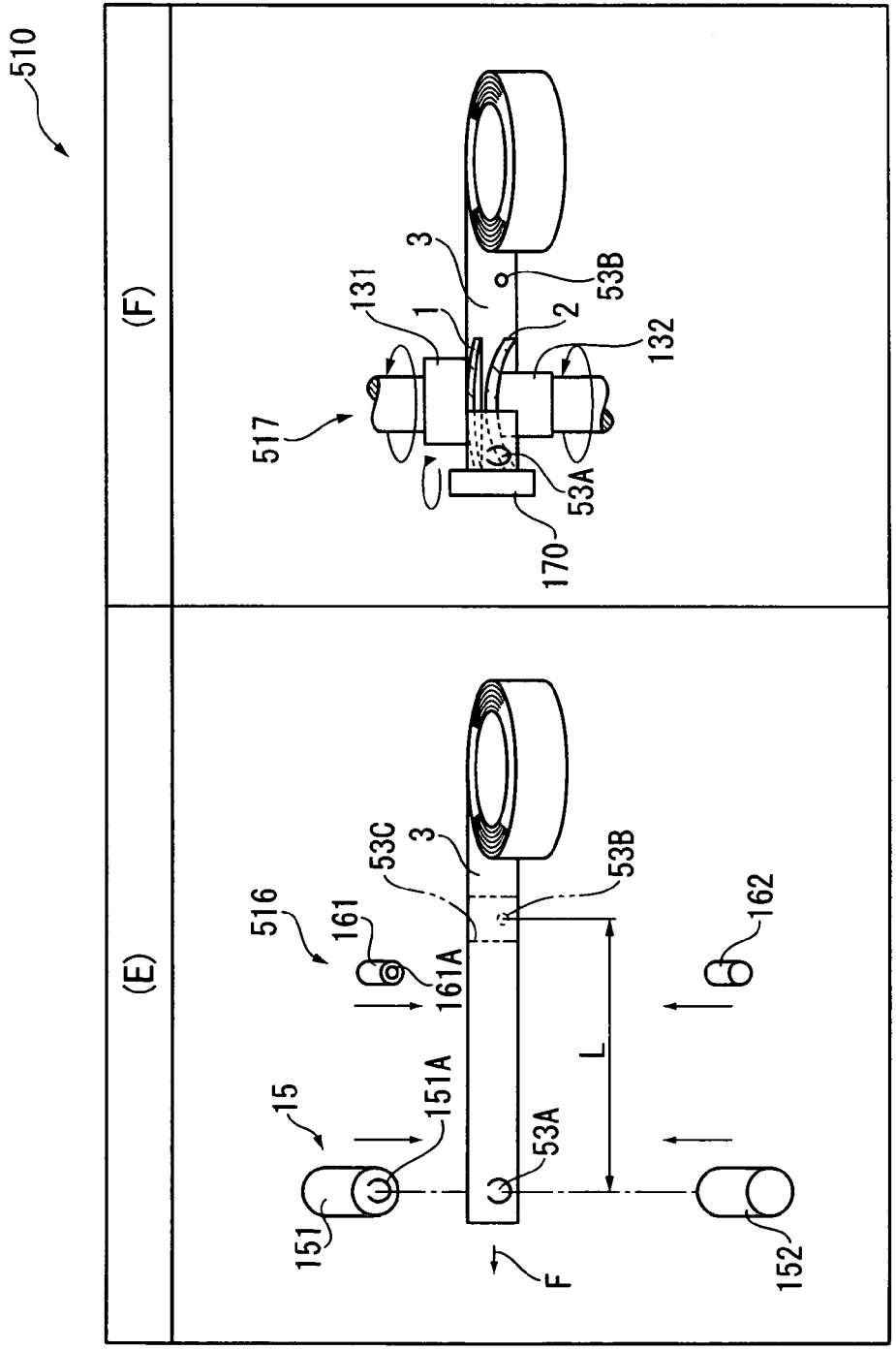
FIG. 7 is a schematic illustration showing remaining parts of the forming apparatus for a mold and processes (E) and (F) of the method of forming a mold according to the second exemplary embodiment.

A schematic configuration of the mold forming apparatus according to the second exemplary embodiment is separately illustrated in FIGS. 6 and 7.

In FIGS. 6 and 7, a mold forming apparatus 510 includes: the first centripetal device 11A; the second centripetal device 11B; the mold astigmatic axis detecting device 12; the first measuring device 13A; the second measuring device 13B; and the molding die positioning device 14, each of which is the same as that in the first exemplary embodiment; a tab forming device 15; an injection port forming device 516 that forms an injection port on the tape 3; and a tape winding device 517 that winds the tape 3 around peripheral surfaces of the first molding die 1 and the second molding die 2.

As shown in processes (A) to (D) in FIG. 6, each of the first centripetal device 11A, the second centripetal device 11B, the mold astigmatic axis detecting device 12, the first measuring device 13A, the second measuring device 13B, and the molding die positioning device 14 has the same configuration as that of the first exemplary embodiment.

As shown process (E) in FIG. 7, the tab forming device 15 has a same configuration as the injection port forming device 15 of the first exemplary embodiment, and forms a tab 53A by punching a part of the tape 3, which is to be wound around the peripheral surfaces of the first molding die 1 and the second molding die 2, in a substantially C shape.

The injection port forming device 516 forms an injection port main body 53B having a circular shape at a position apart from the position of the tape 3 on which the tab 53A is formed by a length L in a longitudinal direction, and includes a pair of press dies 161 and 162 oppositely positioned through an intermediation of the tape 3. The press die 161 of the two press dies is a male die having a blade 161A of a circular shape, and the press die 162 of the other one of the two press dies, is a female die that receives the blade 161A. In this exemplary embodiment, a portion of the tape 3, where the injection port main body 53B is formed, serves as an injection port forming portion 53C. In other words, the injection port forming portion 53C is continuously formed with respect to the tape 3. It should be noted that, in the second exemplary embodiment, an injection port is composed of the tab 53A and the injection port main body 53B.

As with the tab forming device 15, a method of forming the injection port main body 53B of the injection port forming device 516 is not limited to a particular method. For example, there may be employed a cutting method using laser light, a method of pressing a heated die against the tape 3 to melt the tape 3, or a method of spraying heat-compressed air. The shape of the injection port main body 53B is not limited to the circular shape. There may be employed a rectangular shape, a triangular shape, an elliptical shape, or the like.

As described below, the length L is set so that the injection port main body 53B is positioned above the tab 53A, when the tape 3 is wound around the peripheral surfaces of the first molding die 1 and the second molding die 2, and when both end portions of the tape 3 overlap one another (see FIG. 9). In other words, the length L is substantially the same as the circumferential length of each of the first molding die 1 and the second molding die 2. Further, an area of the tab 53A is larger than that of the injection port main body 53B (see FIG. 11B).

As shown in process (F) in FIG. 7, the tape winding device 517 includes: a rotation driving device (not shown) that drives the spindle 131 holding the first molding die 1 to rotate; another rotation driving device (not shown) that drives the spindle 132 holding the second molding die 2 to rotate; and a guide roller 170 that presses the tape 3 against the peripheral surfaces of the first molding die 1 and the second molding die 2 in order to wind the tape 3 around the peripheral surfaces of the first molding die 1 and the second molding die 2. On the surface of the tape 3 which opposes the peripheral surfaces of the first molding die 1 and the second molding die 2, an adhesive is applied in advance. Accordingly, by operating the rotation driving devices in a state where an end portion of the tape 3 is adhered to portions of the peripheral surfaces of the first molding die 1 and the second molding die 2, the tape 3 is wound around the entire peripheral surfaces of the first molding die 1 and the second molding die 2.

After completion of winding of the tape 3 around the entire peripheral surfaces of the first molding die 1 and the second molding die 2, a predetermined position of the tape 3 is cut by a cutter (not shown) to form the mold 4.

Figure 8:
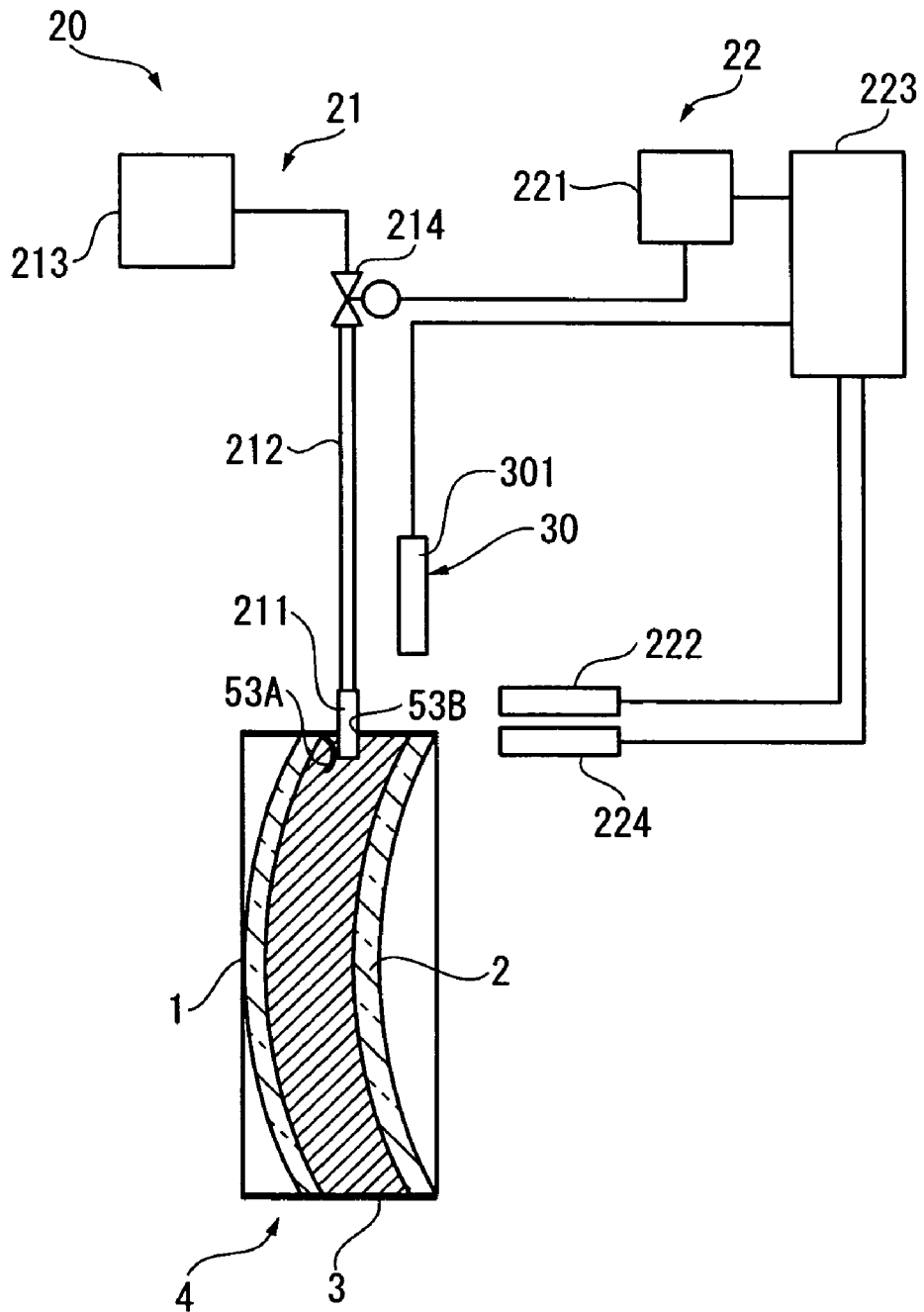
FIG. 8 is a diagram schematically showing a configuration of a plastic lens manufacturing apparatus according to the second exemplary embodiment other than the forming apparatus for a mold.

FIG. 8 shows the configuration of the plastic lens manufacturing apparatus except for the mold forming apparatus 10.

As shown in FIG. 8, the plastic lens manufacturing apparatus includes the resin injection device 20 that injects a resin material for forming a plastic lens from the injection port main body 53B into the mold 4, and the tab restoring device 30 that restores the tab 53A to its original position.

The resin injection device 20 includes: the placing unit (not shown) that places the mold 4 so that an axial direction thereof becomes substantially horizontal; the supplying unit 21 that supplies the resin material to the inner portion of the mold 4; and the control unit 22 that controls an amount of the resin material to be supplied.

The supplying unit 21 includes: the nozzle 211 that injects the resin material into the mold 4 from the injection port main body 53B; the resin material flow tube 212 whose lower end portion is connected to the base end portion of the nozzle 211; and the material storing unit 213 that is connected to an upper end portion of the resin material flow tube 212. The resin material flow tube 212 is provided with the injection control valve 214. The injection control valve 214 controls an opening amount of the resin material flow tube 212, thereby controlling an amount of the resin material to be supplied from the nozzle 211.

The nozzle 211 is arranged so that the end thereof opposes the injection port main body 53B and the tab 53A formed on the tape 3 of the mold 4. Further, the nozzle 211 is configured so as to penetrate the injection port main body 53B and wedge the tab 53A into the inner portion of the mold 4 by the advancing and retreating device (not shown), and to be detached from the injection port main body 53B and the tab 53A.

The control unit 22 includes: the flow rate regulating unit 221 that controls the injection control valve 214; the sensor 222 that detects that the resin material has been injected up to a predetermined position of the inner portion of the mold 4; the sensor 224 that switches a flow of the resin material; and the control unit main body 223 that controls the flow rate regulating unit 221 in response to the signals from the sensors 222 and 224.

Each of the sensors 222 and 224 arranged in the vicinity of the injection port main body 53B of the mold 4 is an optical sensor that detects the amount of the resin material injected into the mold 4 using light.

The tab restoring device 30 restores the tab 53A depressed by the nozzle 211 to its original position, and includes the suction pipe 301 that sucks the tab 53A and the vacuum suction device (not shown) connected to the base end portion of the suction pipe 301. The vacuum suction device is controlled by the control unit main body 223.

The suction pipe 301 is capable of moving three-dimensionally. In a case where the resin injection device 20 is operated, the suction pipe 301 retreats to a position where the suction pipe 301 can avoid interference with the resin injection device 20. In a case where the tab restoring device 30 is operated, the suction pipe 301 moves to the vicinity of the tab 53A.

Subsequently, a method of manufacturing a plastic lens will be explained.

(Forming Mold)

First, as shown in process (A) in FIG. 6, the first molding die 1 is chucked by the first centripetal device 11A and the second molding die 2 is chucked by the second centripetal device 11B, whereby each molding die is centripetally positioned and the outer diameter is measured.

Then, as shown in process (B) in FIG. 6, using the mold astigmatic axis detecting device 12, the astigmatic axis direction of the second molding die 2 is detected and cylindrical power thereof is measured.

As shown in process (C) in FIG. 6, the spindles 131 and 132 respectively absorbs and holds the first molding die 1 and the second molding die 2 by the first measuring device 13A and the second measuring device 13B, and the first measuring device 13A and the second measuring device 13B respectively measure the thickness of the first molding die 1 between the surface center position absorbed by the spindle 131 and the bottom surface center position thereof and the thickness of the second molding die 2 between the surface center position absorbed by the spindle 132 and the top surface center position thereof.

As shown in process (D) in FIG. 6, the molding die positioning device 14 positions each of the spindles 131 and 132 in a spacing direction, using data on the thickness of the first molding die 1 between the surface center position absorbed by the spindle 131 and the bottom surface center position thereof, the thickness of the second molding die 2 between the surface center position absorbed by the spindle 132 and the top surface center position thereof, and center thickness, to allow the center position of the first molding die 1 and the center position of the second molding die 2 to be apart from each other by a predetermined distance (center thickness). Further, the molding die positioning device 14 positions each of the spindles 131 and 132 in a rotating direction so that an injecting position is at a position where a value of a portion corresponding to the thickness of the peripheral portion of a lens becomes a maximum value in order to facilitate an insertion of the nozzle 211 when the resin material for forming a plastic lens is injected in the mold 4. In other words, a position of each of the spindles 131 and 132 where a value of a portion corresponding to the thickness of the peripheral portion of a lens becomes a maximum value is decided based on the astigmatic axis direction of the second molding die 2 measured by using the mold astigmatic axis detecting device 12. Further, a value of a portion corresponding to a thickness of a peripheral portion of the second molding die 2 and a portion corresponding to the thickness of the peripheral portion of a plastic lens at the injecting position is measured. Based on the value of the portion corresponding to the thickness of the peripheral portion of the second molding die 2 and the value of the portion corresponding to the thickness of the peripheral portion of a plastic lens, an injection port position in a thickness direction of the peripheral portion of the first molding die 1 and the second molding die 2 with the lower surface of the second molding die 2 as a reference is calculated. Then, based on the outer diameter of each of the first molding die 1 and the second molding die 2, outer peripheral values thereof are calculated.

As shown in process (E) in FIG. 7, the tab forming device 15 performs a tab step in which the part of the tape 3 on one end side is cut out non-circularly, whereby the tab 53A is formed.

The position at which the tab 53A is to be formed on the tape 3 in a height direction (the position in a width direction of the tape 3) is decided based on the calculated value of the injection port position with the lower surface of the second molding die 2 which is obtained in the previous step as a reference. The position in a lateral direction (the position in a longitudinal direction of the tape 3) is decided by controlling a tape winding start position so that the tab 53A comes to the position at which a value of a portion corresponding to the thickness of the peripheral portion of the positioned plastic lens becomes a maximum value.

After that, the tape 3 is pulled out in a direction indicated by the arrow F, and at a position apart from the tab 53A by the length L, the injection port main body 53B is formed on the other end portion side of the tape 3 by using the injection port forming device 516. The length L corresponds to the outer peripheral value of each of the first molding die 1 and the second molding die 2, which is obtained in the previous step. The position at which the injection port main body 53B is formed on the tape 3 in a height direction (the position in a width direction of the tape 3) corresponds to the position at which the tab 53A has been formed.

Further, as shown in process (F) in FIG. 7, the tape winding device 517 winds the tape 3 on which the tab 53A has been formed around the peripheral surfaces of the first molding die 1 and the second molding die 2.

The first molding die 1 and the second molding die 2 are synchronously rotated by the spindles 131 and 132, whereby the tape 3 is wound around the peripheral surfaces of the first molding die 1 and the second molding die 2. When the tape 3 is wound around the peripheral surfaces of the first molding die 1 and the second molding die 2, the height of the lower surface of the second molding die 2 is the same as the height of the lower edge of the tape 3 (see FIG. 10A).

Figure 9:
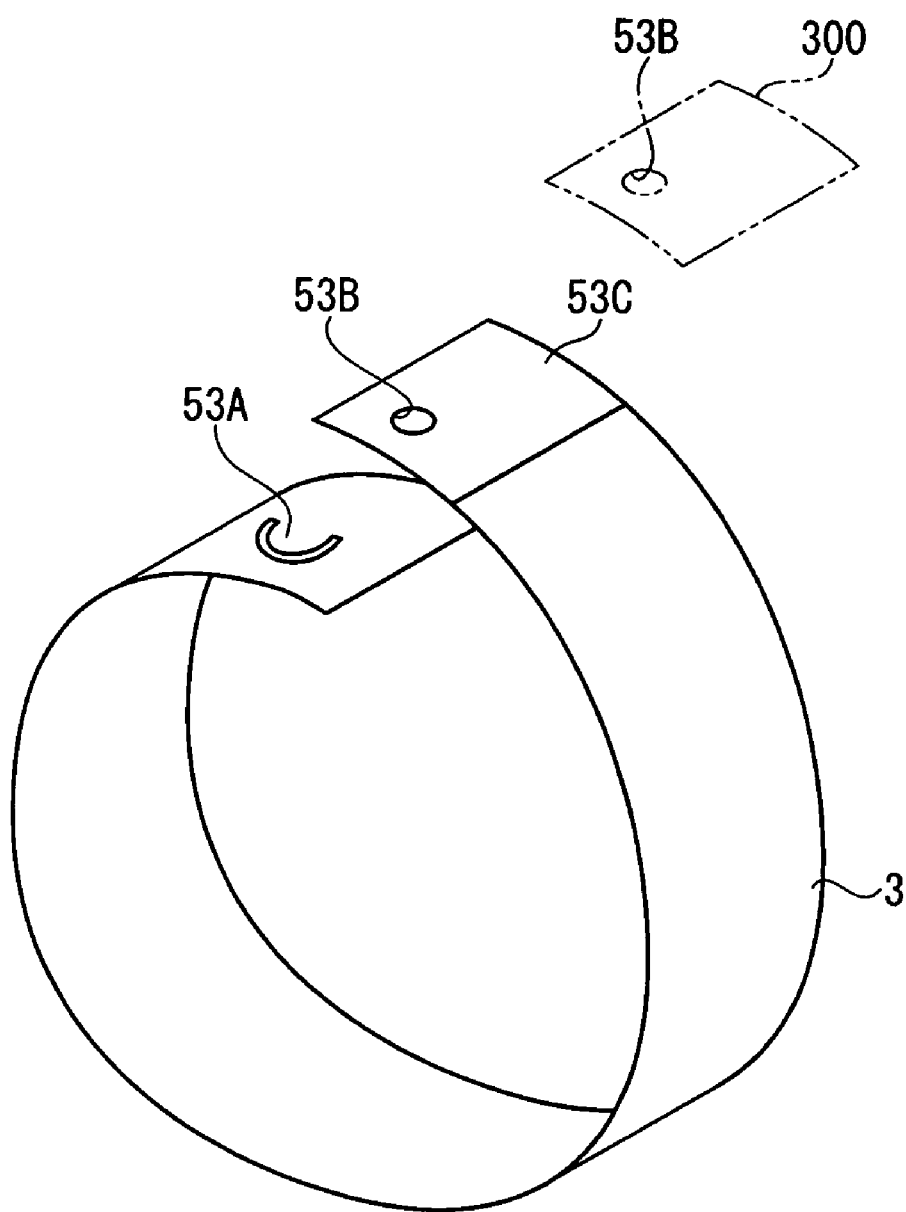
FIG. 9 is a perspective view showing a state where both end portions of a tape is superimposed on each other.
Figure 10A:
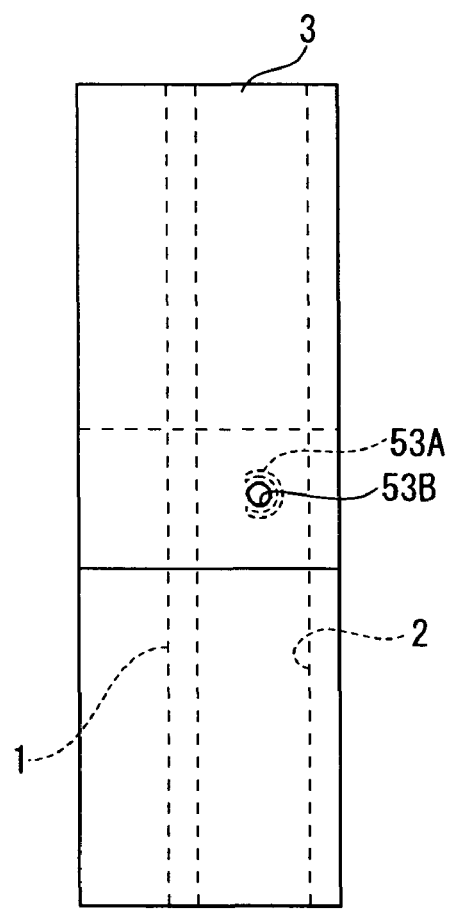
FIG. 10A is a side view of a mold and FIG. 10B is an enlarged side view of a main portion of the mold, respectively.
Figure 10B:
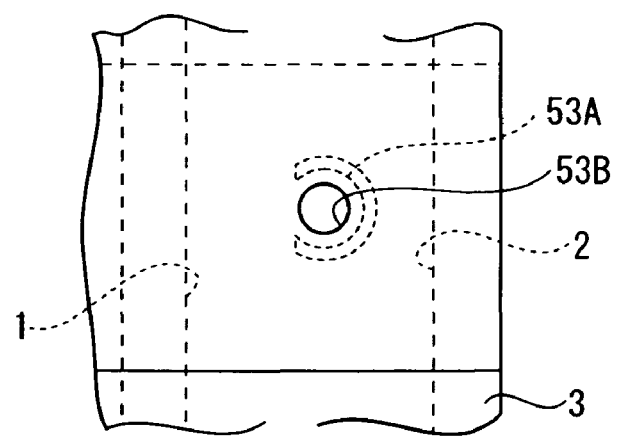

Herein, as shown in FIGS. 9, 10A, and 10B, the tape 3 is wound around the entire peripheral surfaces of the first molding die 1 and the second molding die 2 so that both end portions of the tape 3 overlap one another and that the injection port main body 53B positions above the tab 53A. The injection port forming step and the tape winding step are carried out at the same time.

When the tape 3 is wound around the entire peripheral surfaces of the first molding die 1 and the second molding die 2 and a portion of the tape 3 overlaps the end portion thereof, the tape 3 is cut. As a result, the mold 4 is structured.

(Resin Injection)

The resin injection device 20 injects the resin material for forming a plastic lens into the mold 4.

First, the mold 4 is positioned so that the tab 53A is at the highest position. After that, the nozzle 211 is lowered and the tab 53A is depressed with the lower end portion thereof (see FIG. 11A). The tab 53A is deformed in a curved manner due to the elastic force. Since the tab 53A is deformed, the bent portion and the vacant portion formed through depressing of the tab 53A form a space continuous to the injection port main body 53B on the tape 3.

Further, the resin material for forming a plastic lens is injected into the mold 4 from the injection port main body 53B via the nozzle 211. Herein, the control unit 22 initiates and terminates the injection and switches the injection flow.

The sensor 224 detects that the fluid level of the resin material for forming a plastic lens has reached the vicinity of the injection port main body 53B, and the injection flow is gradually decreased. When the fluid level reaches a predetermined level, the injection operation is continued while the nozzle 211 is ascended.

Figure 11A:
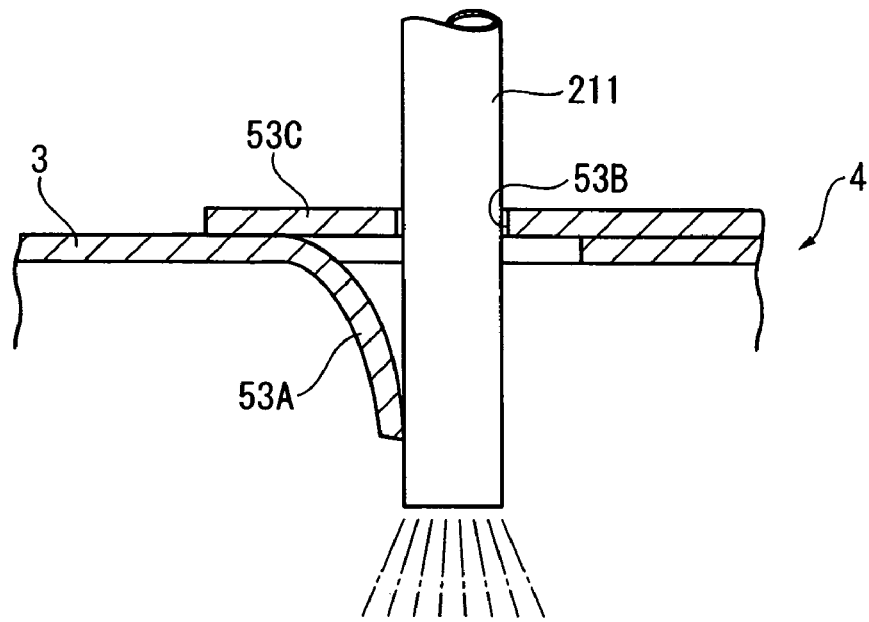
FIG. 11A is a sectional view showing a state where a resin material for forming a plastic lens is injected into the mold.
Figure 11B:
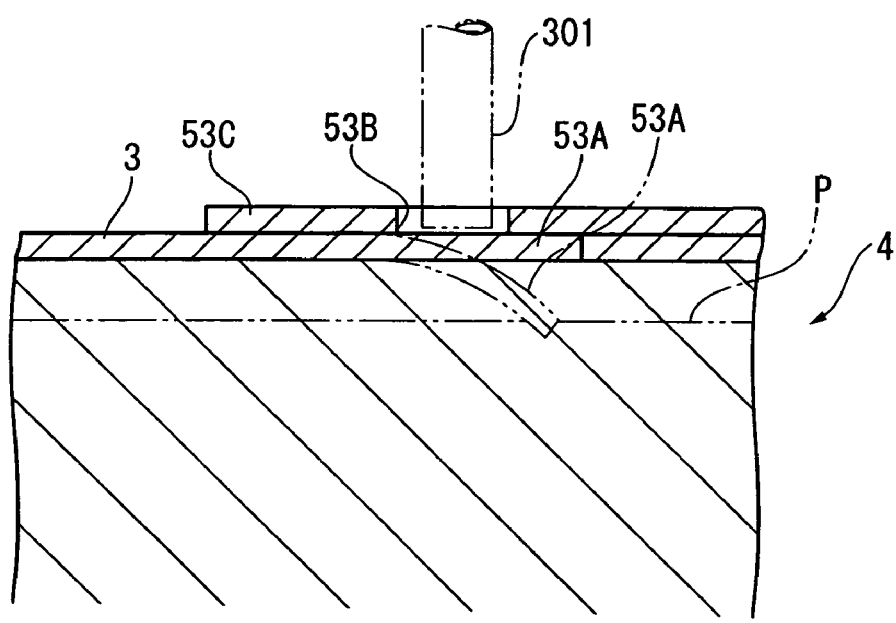
FIG. 11B is a sectional view showing a state where an injection port of the mold is sealed, respectively.

Herein, as shown in FIG. 11B, a fluid level P of the resin material injected into the mold 4 gradually ascends. When the fluid level P ascends to the position of the tab 53A and the nozzle 211 ascends, a lower end portion of the tab 53A ascends along with the fluid level P.

When the sensor 222 detects that the resin material for forming a plastic lens has filled the inner portion of the mold 4, the signal is transmitted from the sensor 222 to the control unit 22, thereby stopping the injection of the resin material for forming a plastic lens.

(Tab Restoring)

When the predetermined amount of the resin material is injected into the mold 4, the nozzle 211 retreats to a position apart from the injection port main body 53B. As a result, the tab 53A depressed by the lower end portion of the nozzle 211 returns to a position close to the original position by the elastic force and buoyant force thereof.

Then, the tab restoring device 30 is operated. In other words, the suction pipe 301 is moved to the vicinity of the tab 53A, the tab 53A is sucked by the suction pipe 301 by operating the vacuum suction device, and the injection port main body 53B is completely clogged. As a result, the injection port main body 53B is sealed.

(Heating: Step and the like)

After the injection port main body 53B is sealed, the mold 4 is placed in a furnace to be heated and cured.

The mold 4 is taken out of the furnace, the tape 3 wound around the mold 4 is peeled off, and the first molding die 1 and the second molding die 2 are removed, whereby the base material of a plastic lens is formed. The surface of the base material is polished, processed, etc. if required, whereby a plastic lens is obtained.

Therefore, the second exemplary embodiment can obtain the following effects.

(7) In order to form the injection port main body 53B from which the resin material is injected on the tape 3 of the mold 4, which is obtained by winding the tape 3 around the peripheral surfaces of the first molding die 1 and the second molding die 2, the tab 53A is formed by cutting out a portion of the tape 3 non-circularly. Subsequently, the tape 3 is wound around the peripheral surfaces of the first molding die 1 and the second molding die 2 in such a manner that both ends of the tape 3 are allowed to overlap one another, and, so that the tab 53A is exposed. Subsequently, the tape-like injection port forming portion 53C on which the injection port main body 53B has been previously formed is superimposed on the tab 53A. Further, the area of the injection port main body 53B is smaller than that of the tab 53A, and the injection port main body 53B is positioned above the tab 53A. Further, before the tape 3 is wound around the peripheral surfaces of the first molding die 1 and the second molding die 2, the tab 53A is formed on the tape 3 and the injection port main body 53B is formed on the injection port forming portion 53C. As a result, no refuse and the like resulting from the process of the base material of the tape 3, which is generated during the formation of the tab 53A and the injection port main body 53B constituting the injection port, is included in the inner portion of the mold 4. Further, no foreign substance is included in a plastic lens. Therefore, the appearance of the plastic lens is not be deteriorated. Further, the tab 53A ascends along with the ascend of the fluid level of the resin material for forming a plastic lens injected into the mold 4, and the injection port main body 53B is eventually clogged by the tab 53A. Accordingly, since there is no need to use ultraviolet-curable resin, which is expensive, to seal the injection port main body 53B, the manufacturing cost of a plastic lens can be lowered.

(8) The mold forming apparatus according to the second exemplary embodiment includes: the tab forming device 15 that forms the tab 53A on one end portion side of the tape 3; the injection port forming device 516 that forms the injection port main body 53B on the other end side of the tape 3 to be smaller than an area of the tab 53A; and the tape winding device 517 that winds the tape 3 around peripheral surfaces of the first molding die 1 and the second molding die 2, and overlaps both ends of the tape 3 so that the injection port main body 53B is superimposed on the tab 53A. The mold forming apparatus is so configured that the injection port forming step and the tape winding step are conducted substantially at the same time. Accordingly, by merely winding the tape 3 around peripheral surfaces of the first molding die 1 and the second molding die 2, the winding of the tape and the formation of the injection port are continuously carried out. As a result, the mold can be formed with high efficiency.

(9) The tab 53A has a substantially C shape and the injection port main body 53B has a circular shape. Since both have an outer shape of an arc, the center position of the tab 53A and that of the injection port main body 53B are set with ease, and therefore, the injection port main body 53B can be positioned above the tab 53A with ease. As a result, by inserting the nozzle 211 into the injection port main body 53B, the tab 53A can be positively depressed thereby. Therefore, the resin material for forming a plastic lens can be injected into the inner portion of the mold 4, and a plastic lens can be manufactured with high precision.

It should be noted that the invention is not limited to the above exemplary embodiments. The invention can be modified, improved, or the like as long as the object of the invention is attained.

For example, in the above exemplary embodiments, each of the tabs 3A and 53A may be processed after the tape 3 is wound around the peripheral surfaces of the first molding die 1 and the second molding die 2.

Further, while in the above exemplary embodiments, the nozzle 211 wedges each of the tabs 3A and 53A, a member other than the nozzle 211 may be newly provided and the member may wedge each of the tabs 3A and 53A.

In the invention, measures for restoring each of the tabs 3A and 53A are not necessarily employed. In a case where the tape 3 has large elastic force, each of the tabs 3A and 53A returns to the original position by itself after the nozzle 211 is allowed to ascend.

Further, each of the plurality of tabs 3A and the plurality of tabs 53A may be arranged close to each other in the longitudinal direction of the tape 3 and the resin may be injected into the mold 4 by inserting the nozzle 221 in each of the plurality of tabs 3A and the plurality of tabs 53A.

Further, in place of the injection port main body 53B of the second exemplary embodiment, the tab 53A may be formed. In this case, by depressing the tabs 53A overlapping one another by a single nozzle 211, the lower end portion of the nozzle 211 may be inserted into the inner portion of the mold 4.

The invention can be applied to a device in which a plastic lens for glasses, a telescope, a lens for a camera, or the like is manufactured.

What is claimed is:

1. A method of forming a mold provided by winding a tape around peripheral surfaces of a first molding die and a second molding die, the mold having an injection port for injecting resin material into an inside of the mold, the injection port including an injection port main body and a tab for sealing the injection port main body, the method comprising:
    forming the tab by cutting out part of the tape non-circularly; and
    winding the tape around the peripheral surfaces of the first molding die and the second molding die,
    wherein the tab forming comprises: providing the tab by a part of the tape integrated with the rest of the tape, the tab and the rest of the tape being connected in a bendable manner, and forming the tab in advance and superimposing a tape-like injection port forming portion having the injection port main body formed in advance onto the tab,
    the tape superimposing comprises positioning the injection port main body formed to have an area smaller than the area of the tab so that the injection port main body is positioned over the tab; and
    the tape winding comprises winding the tape around the peripheral surfaces of the first molding die and the second molding die so that both end portions of the tape are superimposed on each other and the tab is exposed.

2. The method of forming a mold according to claim 1, wherein:
    the injection port forming portion is formed continuously with the end portion of the tape; and
    formation of the injection port main body and formation of the tab are carried out at the same time.

* * * * *